US009002621B2

(12) United States Patent
Hauser

(10) Patent No.: US 9,002,621 B2
(45) Date of Patent: Apr. 7, 2015

(54) METHOD FOR CORRECTING INJECTION QUANTITIES AND/OR TIMES OF A FUEL INJECTOR

(75) Inventor: Christian Hauser, Lappersdorf (DE)

(73) Assignee: Continental Automotive GmbH, Hannover (DE)

( * ) Notice: Subject to any disclaimer, the term of this patent is extended or adjusted under 35 U.S.C. 154(b) by 784 days.

(21) Appl. No.: 13/124,183

(22) PCT Filed: Sep. 24, 2009

(86) PCT No.: PCT/EP2009/062361
§ 371 (c)(1), (2), (4) Date: Apr. 14, 2011

(87) PCT Pub. No.: WO2010/043479
PCT Pub. Date: Apr. 22, 2010

(65) Prior Publication Data

US 2011/0202255 A1 Aug. 18, 2011

(30) Foreign Application Priority Data

Oct. 15, 2008 (DE) ........................ 10 2008 051 820

(51) Int. Cl.
*F02D 41/40* (2006.01)
*G06F 7/00* (2006.01)
(Continued)

(52) U.S. Cl.
CPC .......... *F02D 41/008* (2013.01); *F02D 41/2416* (2013.01); *F02D 41/247* (2013.01); *F02D 2200/0614* (2013.01)

(58) Field of Classification Search
CPC .................... F02D 41/2467; F02D 2200/0614; F02D 2041/1433; F02D 41/40; F02D 41/2432; F02D 41/1402; Y02T 10/44
USPC .......... 123/299, 436, 478, 480, 486; 701/102, 701/103, 104, 106, 115; 73/114.45, 114.48, 73/114.49, 114.51, 114.58
See application file for complete search history.

(56) References Cited

U.S. PATENT DOCUMENTS 4,783,009 A * 11/1988 Coates .......................... 239/580
6,237,567 B1 5/2001 Nakano et al. ................ 123/446
(Continued)

FOREIGN PATENT DOCUMENTS

DE 19645441 A1 4/2000 ............. F02D 41/24
DE 10140151 A1 2/2003 ............. F02D 41/38
(Continued)

OTHER PUBLICATIONS

International PCT Search Report and Written Opinion, PCT/EP2009/062361, 14 pages, Nov. 18, 2009.

*Primary Examiner* — Lindsay Low
*Assistant Examiner* — David Hamaoui
(74) *Attorney, Agent, or Firm* — King & Spalding L.L.P.

(57) ABSTRACT

In a method for individually correcting injection quantities and/or times ($mf_1$, $mf_2$, mf . . . ; $ti_1$, $ti_2$, ti . . . ) in particular for a ballistic operating range of a fuel injector (1, 2, . . . ), a quantity deviation of an actual injection quantity (mf1, mf2, mf . . . ) from a nominal injection quantity (mfnom) of the fuel injector (1, 2, . . . ) during operation of the fuel injector (1, 2, . . . ) is determined, and a typical injection characteristic ($fup_1$, $fup_2$, fup . . . ) of the fuel injector (1, 2, . . . ) is adapted to a nominal injection characteristic (fupnom) based on the quantity deviation. Furthermore, a controller, in particular an engine controller may implement the above method.

13 Claims, 4 Drawing Sheets

(51) Int. Cl.
*F02D 41/00* (2006.01)
*F02D 41/24* (2006.01)

(56) References Cited

U.S. PATENT DOCUMENTS

| | | | | |
|---|---|---|---|---|
| 6,360,161 | B1 * | 3/2002 | Francis et al. | 701/115 |
| 6,615,128 | B1 * | 9/2003 | Hellmich | 701/104 |
| 6,694,953 | B2 * | 2/2004 | Barnes et al. | 123/500 |
| 6,879,903 | B2 * | 4/2005 | Jaliwala et al. | 701/104 |
| 6,962,140 | B1 * | 11/2005 | Nakai et al. | 123/436 |
| 7,025,047 | B2 * | 4/2006 | Leman et al. | 123/486 |
| 7,136,743 | B2 * | 11/2006 | Peltier | 701/115 |
| 7,219,005 | B2 * | 5/2007 | Mazet | 701/104 |
| 7,373,918 | B2 * | 5/2008 | Uchiyama | 123/299 |
| 7,895,990 | B2 * | 3/2011 | Ishizuka et al. | 123/478 |
| 2006/0107936 | A1 | 5/2006 | Mazet | 123/672 |

FOREIGN PATENT DOCUMENTS

| | | | | |
|---|---|---|---|---|
| DE | 10330091 | A1 | 1/2005 | F02D 41/20 |
| DE | 10349883 | A1 | 6/2005 | F02D 41/40 |
| DE | 102004007799 | A1 | 9/2005 | F02D 41/00 |
| DE | 69923245 | T2 | 4/2006 | F02D 41/30 |
| DE | 102004050761 | A1 | 4/2006 | F02D 41/30 |
| DE | 102006009920 | A1 | 9/2007 | F02D 41/40 |
| DE | 602004003390 | T2 | 10/2007 | F02D 41/24 |
| DE | 102007018627 | A1 | 10/2008 | F02M 65/00 |

* cited by examiner

METHOD FOR CORRECTING INJECTION QUANTITIES AND/OR TIMES OF A FUEL INJECTOR

CROSS-REFERENCE TO RELATED APPLICATIONS

This application is a U.S. National Stage Application of International Application No. PCT/EP2009/062361 filed Sep. 24, 2009, which designates the United States of America, and claims priority to German Application No. 10 2008 051 820.4 filed Oct. 15, 2008, the contents of which are hereby incorporated by reference in their entirety.

TECHNICAL FIELD

The invention relates to a method for individually correcting injection quantities and/or times, in particular for a ballistic operating range of a fuel injector. Furthermore, the invention relates to a controller, in particular an engine controller, which carries out a method according to the invention.

BACKGROUND

Legal regulations which are becoming ever stricter with regard to permissible pollutant emissions of internal combustion engines for motor vehicles make it necessary to take measures, by way of which the pollutant emissions can be lowered. It is a starting point here to achieve improved mixture preparation in the cylinders of the internal combustion engine. Correspondingly improved mixture preparation can be achieved if fuel is metered in at a defined pressure by means of fuel injectors. In the case of a diesel internal combustion engine, fuel pressures of this type are as high as over 2000 bar.

In a fuel injector, control of an injection of fuel usually takes place by means of a nozzle needle which is mounted displaceably in a nozzle assembly of the fuel injector and releases or closes one or a plurality of spray holes of a nozzle body of the nozzle assembly for the fuel to be injected as a function of its position. A mechanical actuation of the nozzle needle usually takes place by way of an actuator, preferably a piezoelectric actuator, which either acts mechanically with the nozzle needle or acts via a servovalve and a control space on a transmission element (piston) which interacts mechanically with the nozzle needle or is formed integrally with the latter. The nozzle needle and the transmission element are usually mounted slidingly here in a sliding guide with a small play, lubrication of this mounting as a rule taking place by way of the fuel to be injected.

In order to lower the pollutant emissions and also to keep a consumption of the internal combustion engine as low as possible, it is desirable to achieve as optimum as possible a combustion within the cylinders of the internal combustion engine. For satisfactory process management and control/regulation of a combustion in the cylinders of the internal combustion engine, it is necessary for it to be possible to meter the fuel to be injected as accurately as possible, in order at every instant to achieve as optimum as possible a combustion and/or as complete as possible a regeneration of a particle filter.

Torque requirements of the internal combustion engine are converted into injection quantities. Each injection quantity is correlated with an injection time as a function of an injection pressure. The resulting injection characteristic curves are stored as a nominal injection characteristic diagram (see also FIG. 1) in software of a controller for the internal combustion engine. These correlations are used for all fuel injectors, individual differences of the fuel injectors, caused, for example, by production deviations or ageing and wear of the components, not being taken into consideration during the entire service life of the fuel injectors.

Deviations of the actual injection quantities from the set-point injection quantities (see also FIG. 2), the latter being called nominal injection quantities in the following text, always have negative effects on a combustion and the pollutant emissions which are produced as a result. If the injection quantities are too small and the actuating times of the fuel injectors are therefore too short, failure of injections and therefore uneven running of the relevant internal combustion engine can occur, moreover. If the injection quantities of the fuel injectors are too great and/or their actuating times are too long, overheating of the internal combustion engine can be the result.

For these reasons, an individual adaptation of the injection quantities and/or times of the relevant fuel injectors is desirable. That is to say, the injection quantities and/or times of each fuel injector are to be adapted to the nominal injection time and/or injection quantity characteristic diagram. This is required, in particular, on account of constantly lowering legal emissions limiting values.

In the prior art (see also below), two methods exist, by way of which an injector-individual adaptation to the nominal injection characteristic diagram is realized partially. This is what is known as IIC (injector individual correction) and MFMA (minimum fuel mass adaptation), MFMA being suitable only for a lower ballistic range of a nozzle needle movement for injection quantities up to approximately 3 mg, and IIC operating too imprecisely in the ballistic range.

SUMMARY

According to various embodiments, an improved method for individually correcting injection quantities and/or injection times, in particular for a ballistic operating range of a fuel injector can be specified. Here, the method according to various embodiments is intended to be capable of being carried out during normal operation of the fuel injector, in order to be capable of compensating for ageing and/or wear phenomena of the fuel injector. Furthermore, the method according to various embodiments is to be capable of being implemented inexpensively and of being carried out rapidly.

According to an embodiment, in a method for individually correcting injection quantities and/or times, in particular for a ballistic operating range of a fuel injector, a quantity deviation of an actual injection quantity from a nominal injection quantity of the fuel injector may be determined during an operation of the fuel injector, and an injector-individually typical injection characteristic curve of the fuel injector may be adapted to a nominal injection characteristic curve as a result of this quantity deviation, a typical injection characteristic curve for the fuel injector being a general injection characteristic curve which relates to a plurality of fuel injectors.

According to a further embodiment, the injector-individually typical injection characteristic curve can be obtained from the typical injection characteristic curve, by a relevant point of the typical injection characteristic curve being shifted into a point of an actual injection quantity. According to a further embodiment, the actual injection characteristic curve for the fuel injector can be calculated from the determined, in particular single, quantity deviation with the nominal injection characteristic curve being taken into consideration. According to a further embodiment, a time duration deviation of an actual injection time from a nominal injection time can be calculated from the quantity deviation, the injector-individually typical injection characteristic curve being adapted to the nominal injection characteristic curve as a result of the time duration deviation. According to a further embodiment, a corrected injection characteristic curve can be drawn up from the deviation of the actual injection quantity/time from the nominal injection quantity/time, by way of which corrected injection characteristic curve the fuel injector is actuated. According to a further embodiment, the injector-individually typical injection characteristic curve can be adapted to the nominal injection characteristic curve with the position of said injector-individually typical injection characteristic curve with respect to the latter being taken into consideration. According to a further embodiment, the injector-individually typical injection characteristic curve can be adapted to the nominal injection characteristic curve with a parallel, a spread, a polynomial or exponential characteristic with respect to the latter being taken into consideration. According to a further embodiment, the injector-individually typical injection characteristic curve being shifted and/or optionally turned into the nominal injection characteristic curve using the deviation. According to a further embodiment, the injector-individually typical injection characteristic curve can be shifted in parallel by the deviation. According to a further embodiment, a part section of the injector-individually typical injection characteristic curve can be adapted to the nominal injection characteristic curve using the deviation. According to a further embodiment, an injector-individually typical injection characteristic curve can be adapted to a second nominal injection characteristic curve by way of a deviation with regard to a first nominal injection characteristic curve. According to a further embodiment, a correction function or a correction value can be taken into consideration in the adaptation of the injector-individually typical second injection characteristic curve to the second nominal injection characteristic curve. According to a further embodiment, the deviation for drawing up a corrected injection characteristic curve or a plurality of corrected injection characteristic curves can be determined only at a single operating point of the fuel injector. According to a further embodiment, the deviation of the actual injection quantity/time of the fuel injector from the nominal injection quantity/time can be determined in a very small quantity injection range of the fuel injector. According to a further embodiment, the deviation of the actual injection quantity/time from the nominal injection quantity/time can be determined in an overrun mode of a relevant internal combustion engine. According to a further embodiment, the deviation of the actual injection quantity/time from the nominal injection quantity/time can be determined by a change in rotational speed on the basis of an injection. According to a further embodiment, the method can be carried out in the ballistic operating range, preferably over substantially the entire ballistic operating range of the fuel injector, and/or in a needle stop operating range of the fuel injector. According to a further embodiment, the method can be carried out in a normal mode of the fuel injector in the internal combustion engine.

According to another embodiment, a controller, in particular an engine controller, can be configured to carry out the method as described above.

BRIEF DESCRIPTION OF THE DRAWINGS

In the following text, the invention will be explained in greater detail using exemplary embodiments, with reference to the appended diagrammatic drawing. In the diagrams of the drawing.

DETAILED DESCRIPTION

Figure 2:
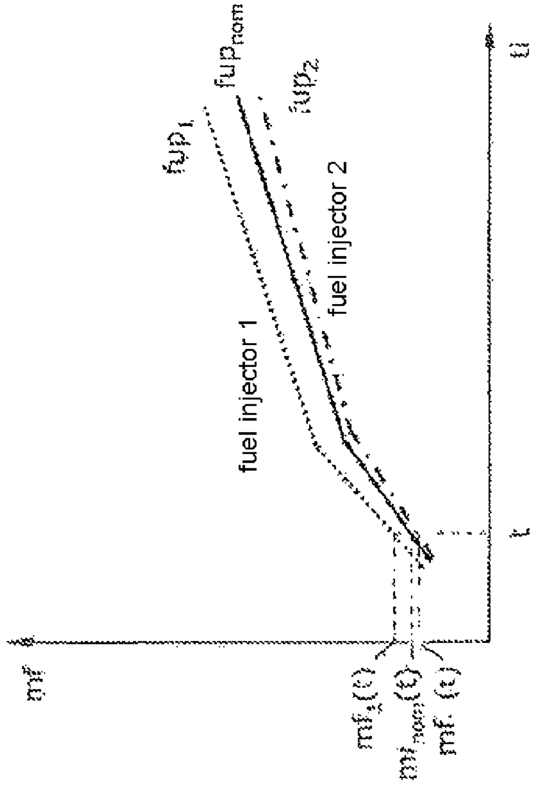
FIG. 2 shows individual injection characteristic curves of two fuel injectors, the fuel quantities of which deviate from the nominal injection quantities in the case of associated injection times.

In the method according to various embodiments for individually correcting injection quantities and/or injection times, a quantity deviation of an actual injection quantity from a nominal injection quantity and/or a time duration deviation of an actual injection time from a nominal injection time of the fuel injector is determined during an operation of the fuel injector. An injection characteristic curve which is typical for the fuel injector is then subsequently modified or adapted to a nominal injection characteristic curve as a result of this quantity and/or time duration deviation. As a result, an injection characteristic curve can be obtained which is corrected for the fuel injector and is therefore individual.

Here, the respective injection characteristic curve can be an injection time characteristic curve or an injection quantity characteristic curve from a corresponding injection characteristic diagram. An injection time characteristic curve is preferably selected from an injection time characteristic diagram. According to various embodiments, a time duration deviation of an actual injection time from a nominal injection time can be calculated from the determined quantity deviation. According to various embodiments, the typical injection characteristic curve of the fuel injector is then modified or adapted to the nominal injection characteristic curve by way of the time duration deviation.

According to various embodiments, the corrected injection characteristic curve can be drawn up from the deviation of the actual injection quantity and/or time from the nominal injection quantity and/or time, by way of which corrected injection characteristic curve the fuel injector is actuated. Here, the typical injection characteristic curve can be adapted to the nominal injection characteristic curve with the location or position of said typical injection characteristic curve with respect to the nominal injection characteristic curve being taken into consideration. This preferably takes place with a parallel, spread, polynomial or exponential characteristic in sections of the typical injection characteristic curve with respect to the nominal injection characteristic curve being taken into consideration.

In embodiments, the injection characteristic curve which is typical for the fuel injector is shifted and/or turned into the nominal injection characteristic curve using the quantity and/or time duration deviation. It is preferred here that the injection characteristic curve which is typical for the fuel injector is shifted at least in parallel by the deviation. This takes place at least for a part section of the injection characteristic curve which is typical for the fuel injector, to a part section of the nominal injection characteristic curve.

That is to say, the typical injection characteristic curve is first of all shifted in parallel within its injection characteristic diagram by the determined quantity and/or time duration deviation. Following this temporally or preceding it temporally, a characteristic curve characteristic of any possible type which is repeated in a plurality of fuel injectors with respect to the nominal injection characteristic curve can be applied to the typical injection characteristic curve. Here, in addition to a shift in the injection characteristic diagram, the typical injection characteristic curve can be turned in its position or have its shape adapted. In its new position in the injection characteristic diagram, the typical injection characteristic curve is then given a shape and/or position which approximate/approximates the nominal injection characteristic curve.

In embodiments, at least one part section of the injection characteristic curve which is typical for the fuel injector is adapted to a corresponding part section of the nominal injection characteristic curve using the quantity and/or time duration deviation. The method is preferably carried out over substantially the entire ballistic operating range. Furthermore, it is possible also to carry out the method according to various embodiments in a needle stop operating range of the fuel injector, it being preferred to carry out the method in a transition range between the ballistic operating range and the needle stop operating range.

In exemplary embodiments of the method, a quantity deviation of an actual injection quantity from the nominal injection quantity of the fuel injector can be determined with regard to a first nominal injection characteristic curve, a second injection characteristic curve which is typical for the fuel injector subsequently being adapted to a second nominal injection characteristic curve by way of this quantity deviation. This then takes place as described above and can of course also take place again via the time duration deviation. Here, the second characteristic curve represents a different injection pressure than the first. In the adaptation of the typical second injection characteristic curve, a correction function or a correction value can be taken into consideration which has been determined empirically, for example.

According to various embodiments, it is sufficient that the quantity and/or time duration deviation is determined only at a single operating point of the fuel injector for drawing up one or a plurality of corrected injection characteristic curves. This preferably takes place in a very small quantity injection range of the fuel injector. Furthermore, it is preferred that the quantity and/or time duration deviation of the actual injection quantity/time from the nominal injection quantity/time is determined in an overrun mode of a relevant internal combustion engine, a change in the rotational speed being determined on the basis of one or a plurality of injections. This preferably takes place in the context of an adaptation of a minimum injection quantity of the fuel injector (MFMA).

According to various embodiments, an injector-individual correction of deviations of the injection quantities is possible by an extrapolation of measured deviations by provision of a suitable function. As a result, it is possible to achieve a substantial reduction in the injector-individual deviations of the injection quantities. According to various embodiments, this is possible above all in the entire ballistic operating range of a fuel injector. Furthermore, the method according to various embodiments can be implemented inexpensively, since only one adaptation of actuating times of the fuel injector takes place, and no structural modifications have to be carried out. Moreover, ageing and wear processes of the fuel injector are taken into consideration.

If a “characteristic curve” is mentioned in the following text, the expressions “characteristic diagram” or “characteristic range” are therefore also to be included. That is to say, a characteristic curve can itself also in turn be a characteristic diagram or a characteristic range. If, furthermore, a typical characteristic curve is mentioned in the following text, a general characteristic curve which relates to a plurality of fuel injectors is intended to be meant by this. That is to say, a characteristic curve of this type is an averaged characteristic curve for a plurality of fuel injectors. This then results according to various embodiments in a corrected or individual characteristic curve of a fuel injector under the precondition that a deviation of the typical characteristic curve from a nominal or ideal characteristic curve is known at at least one point and the typical characteristic curve can thus be positioned with respect to the nominal characteristic curve.

Figure 1:
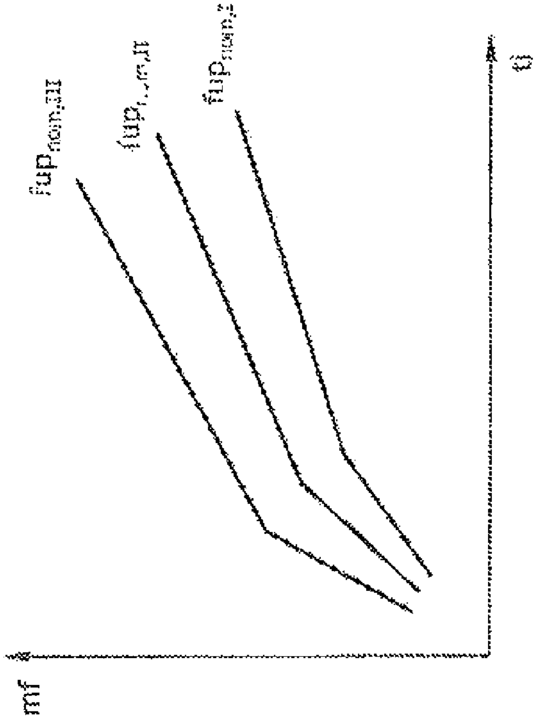
FIG. 1 shows a nominal injection characteristic diagram for a fuel injector, with three injection characteristic curves which in each case represent an injection pressure.

FIG. 1 shows a nominal injection quantity characteristic diagram with three nominal injection characteristic curves $fup_{nom,I}$, $fup_{nom,II}$, $fup_{nom,III}$ which in each case represent a defined injection pressure. These nominal injection characteristic curves $fup_{nom,I}$, $fup_{nom,II}$, $fup_{nom,III}$ represent a desired ideal characteristic of all fuel injectors for a defined application, which fuel injectors are all to output a defined injection quantity mf in the case of a defined injection time ti.

FIG. 2 then shows a real characteristic of two fuel injectors 1, 2 with respect to the ideal nominal characteristic. The injection quantities differ from the ideal injection quantities over the entire operating range, which is shown in FIG. 2 in the case of the time duration t. Here, the injected fuel quantity $mf_1(t)$ of the fuel injector 1 is greater than the nominal fuel quantity $mf_{nom}(t)$ to be injected which in turn is greater than the fuel quantity $mf_2(t)$ which is injected by the fuel injector 2. This also applies to the other injection characteristic curves fup (not shown in FIG. 2) of the fuel injectors 1, 2 in the case of other injection pressures.

There are currently two methods which at least partially make an injector-individual adaptation of injection quantity characteristic diagrams possible. This is IIC (injector individual correction) which has already been mentioned above and MFMA (minimum fuel mass adaptation) which has likewise already been mentioned.

IIC was originally developed, in order to increase a number to be produced of fuel injectors from manufacturing. Here, in the case of a large number of fuel injectors, the injection quantity characteristic diagrams are measured by means of a quantity measuring technique and a mean injection quantity characteristic diagram is calculated. The deviations in the injection quantity characteristic diagram of all subsequently measured fuel injectors from the mean injection quantity characteristic diagram are measured at defined measuring points, are extrapolated using statistical methods for the entire injection quantity characteristic diagram and are stored for vehicle operation in corresponding injection quantity characteristic diagrams. The measurement has to be carried out on a test bench on account of the required measuring means, as a result of which a repetition during driving operation is not possible. That is to say, no correction can be performed during the service life of the fuel injectors. Furthermore, only a low accuracy results in the ballistic operating range of the fuel injectors.

Figure 3:
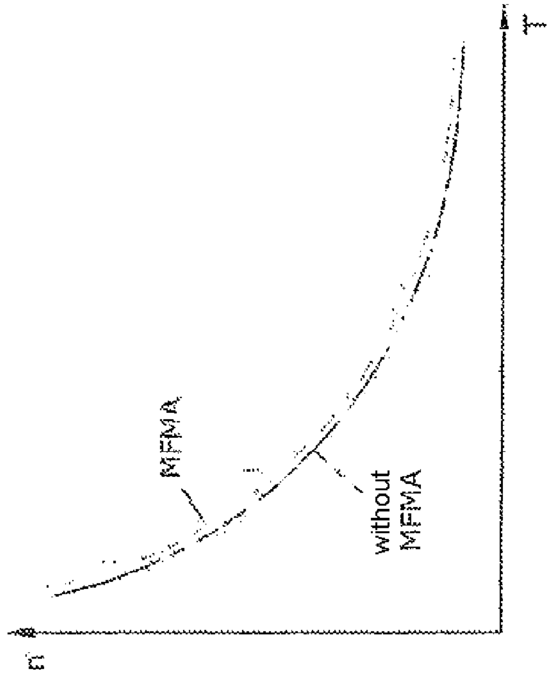
FIG. 3 shows two time profiles of a rotational speed of an internal combustion engine in an overrun phase with and without MFMA (minimum fuel mass adaptation)

In the case of MFMA, the deviations of the actual injection quantities from the setpoint injection quantities of fuel injectors in a very small quantity injection range is defined and adapted by means of changes in the rotational speed during the service life. Here, in overrun phases of the internal combustion engine (see also FIG. 3), in which normally no injections take place, injections with very low quantities are performed in a cylinder and an associated injection quantity is calculated using models via a change which takes place as a result in a rotational speed n (dotted line in FIG. 3). The resulting correction variables are stored for the tested very small quantities in injection quantity characteristic diagrams in an injector-individual manner. A problem of MFMA is that it can be used only in a very small quantity injection range, since otherwise the injections are sensed acoustically or as an acceleration by the driver.

Figure 4:
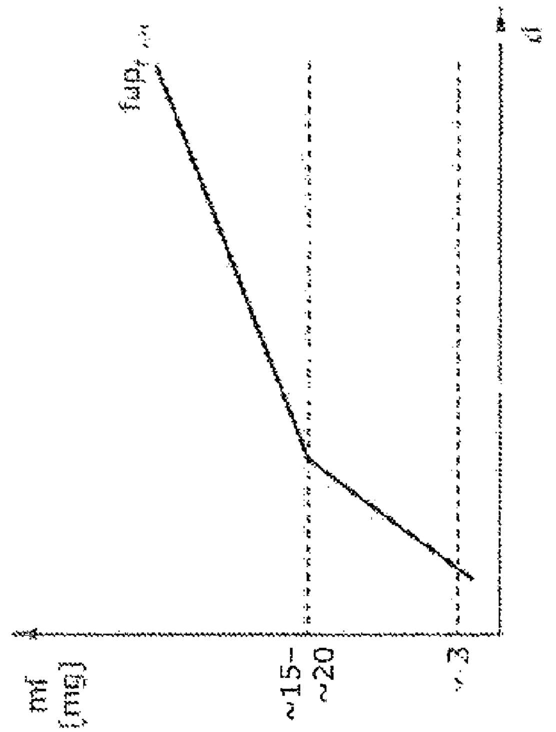
FIG. 4 shows a general form of an overall injection characteristic curve of a fuel injector in a ballistic operating range and a needle stop operating range of the fuel injector.

ICC can be used for quantity correction in a needle stop operating range of the fuel injector 1, 2, and MFMA can be used in a ballistic operating range up to approximately 3 mg per injection; see FIG. 4 in this regard. In the range from approximately 3 mg to approximately 15-20 mg per injection, there is currently not a sufficiently accurate correction method. The needle stop operating range (injection quantities of more than approximately 15-20 mg per injection) and the ballistic operating range (injection quantities up to approximately 15-20 mg per injection) of the fuel injector 1, 2 can be distinguished from one another by a gradient change (kink) in the respective injection characteristic curve.

A correction for a complete injection characteristic diagram during an entire service life of the fuel injector 1, 2 is not possible by way of the available methods. In particular, no method is available, by way of which a sufficient correction for the complete ballistic operating range would be possible.

According to various embodiments, an injector-individual correction of the injection quantity deviations can take place over the entire ballistic operating range of a nozzle needle. Moreover, it is possible also to use the method according to various embodiments in a transition range from the ballistic operating range into the needle stop operating range and also in the entire needle stop operating range of the fuel injector 1, 2.

A measurement of a plurality of fuel injectors 1, 2, . . . has shown that the individual deviations of the respective fuel injectors 1, 2, . . . correspond to predictable patterns, in particular in the ballistic operating range but also in the needle stop operating range. That is to say, the fuel injectors 1, 2, . . . all have substantially a common characteristic; the respective individual characteristic curves $fup_1$, $fup_2$, $fup_{...}$ are similar to one another, but are in each case situated in a different position in the injection characteristic diagram. This pattern is dependent on a structural, that is to say mechanical and hydraulic, design of the fuel injectors 1, 2, . . . .

Thus, in the case of certain fuel injectors 1, 2, . . . , a deviation from the nominal injection quantity $mf_{nom}$ increases as the injection quantity $mf_1$, $mf_2$, $mf_{...}$ increases, for example, that is to say the relevant individual injection characteristic curve $fup_1$, $fup_2$, $fup_{...}$ gapes with respect to the nominal injection characteristic curve $fup_{nom}$, which is shown in FIGS. 5 to 8. That is to say, the deviations can be determined as a spread from the nominal injection characteristic curve $fup_{nom}$.

Moreover, other characteristics which are common to a plurality of fuel injectors 1, 2, . . . are possible. Thus, the respective individual injection characteristic curve $fup_1$, $fup_2$, $fup_{...}$ can extend parallel to the nominal injection characteristic curve $fup_{nom}$. A polynomial or exponential characteristic is also possible. Here, the respective parallel, spread, polynomial or exponential characteristic can also appear only in sections with respect to the nominal injection characteristic curve $fup_{nom}$.

If a respective deviation $\Delta mf_{1,I}$, $\Delta mf_{2,I}$, $\Delta mf_{...,I}$ of an injection quantity $mf_{1,I}$, $mf_{2,I}$, $mf_{...,I}$ is then known only at a single point, that is to say for only a single injection time $ti_{1,I}$, $ti_{2,I}$, $ti_{...,I}$, it is possible according to various embodiments to calculate the deviations for all other points of the relevant individual characteristic curve $fup_{1,I}$, $fup_{2,I}$, $fup_{...,I}$ (see also FIGS. 5 to 7) and also the other relevant individual characteristic curves $fup_{1,II}$, $fup_{2,II}$, $fup_{...,II}$; $fup_{1,...}$, $fup_{2,...}$, $fup_{...,...}$; . . . (see also FIG. 8) of the injection characteristic diagram, and to correct them correspondingly. That is to say, in each case corrected injection characteristic curves $fup_{1,I,korr}$, $fup_{2,I,korr}$, $fup_{...,I,korr}$; $fup_{1,II,korr}$, $fup_{2,II,korr}$, $fup_{...,II,korr}$; $fup_{1,...,korr}$, $fup_{2,...,korr}$, $fup_{...,...,korr}$; . . . are drawn up. The index I, II, . . . represents different injection pressures here.

Figure 5:
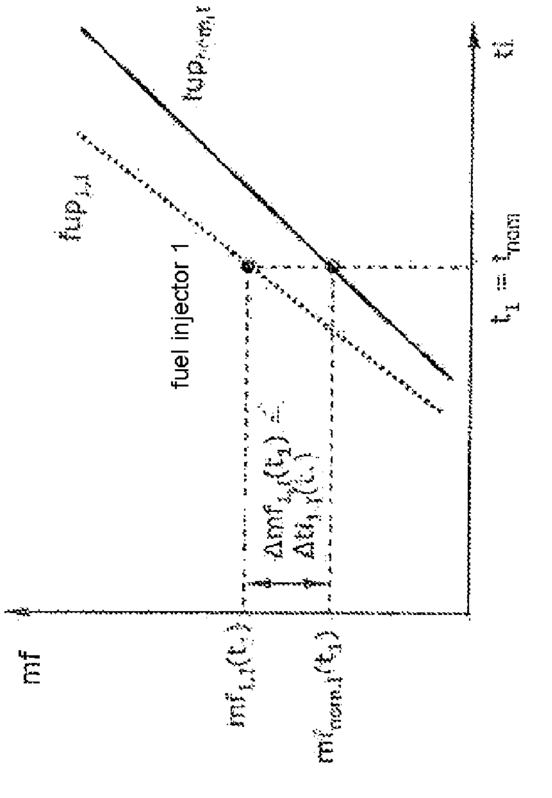
FIG. 5 shows an individual deviation of an injection quantity of a fuel injector in the ballistic operating range from a nominal injection quantity.

The individual injection characteristic curve $fup_{1,I}$ (shown in FIG. 5) of the fuel injector 1 deviates from the nominal injection characteristic curve $fup_{nom,I}$ (likewise known in FIG. 5). Here, only the respective ballistic operating range of the fuel injector 1 and the corresponding sections of the injection characteristic curves $fup_{1,I}$ $fup_{nom,I}$ are shown in FIG. 5. As an actuating duration ti of the fuel injector 1 increases, the actually injected fuel quantity $mf_1$ deviates more and more from the nominal fuel quantity $mf_{nom}$ to be injected.

That is to say, the individual injection characteristic curve $fup_{1,I}$ is spread with respect to the nominal injection characteristic curve $fup_{nom,I}$ that is to say is provided such that it is not only shifted in parallel, but also turned by a defined angular amount with respect to the nominal injection characteristic curve $fup_{nom,I}$. This individual injection characteristic curve $fup_{1,I}$ is obtained by the fact that a mean or typical injection characteristic curve $fup_I$ which is common to many fuel injectors is known by a determination of a really injected fuel quantity $mf_1$ of a fuel injector 1 in its position in the injection characteristic diagram. The individual injection characteristic curve $fup_{1,I}$ differs from a typical injection characteristic curve $fup_1$ in that its position in the injection characteristic diagram is known precisely; a shape still corresponds to the typical injection characteristic curve $fup_I$.

According to various embodiments, in the case of a defined actuating duration $t_1$, a fuel quantity $mf_{1,I}(t_1)$ which is really injected by the fuel injector 1 at an injection pressure I is then determined; see FIG. 5. This can take place, for example, in normal operation of the fuel injector 1 in an internal combustion engine while driving, for example by means of MFMA or via the determination of a generated torque in a respective cylinder of the internal combustion engine. Moreover the fuel quantity $mf_{nom,I}(t_1)$ to actually be injected is known from the associated nominal injection characteristic curve $fup_{nom,I}$ for the actuating duration $t_1=t_{nom}$.

The quantity deviation $\Delta mf_{1,I}(t_1)=|mf_{1,I}(t_1)-mf_{nom,I}(t_1)|$ of the really injected fuel quantity $mf_{1,I}(t_1)$ from the nominal fuel quantity $mf_{nom,I}$ can therefore be determined. A time duration deviation $\Delta ti_{1,I}(t_1)$ can be determined from the quantity deviation $\Delta mf_{1,I}(t_1)$, by way of which time duration deviation $\Delta ti_{1,I}(t_1)$ an actual actuating duration $t_2$ of the fuel injector 1 can then be determined, in order that the latter injects the desired fuel quantity $mf_{nom,I}$ $(t_1)$. In the present example, this is $t_2=t_1-\Delta ti_{1,I}(t_1)$, wherein $\Delta ti_{1,I}(t_1)$ is signed.

Figure 6:
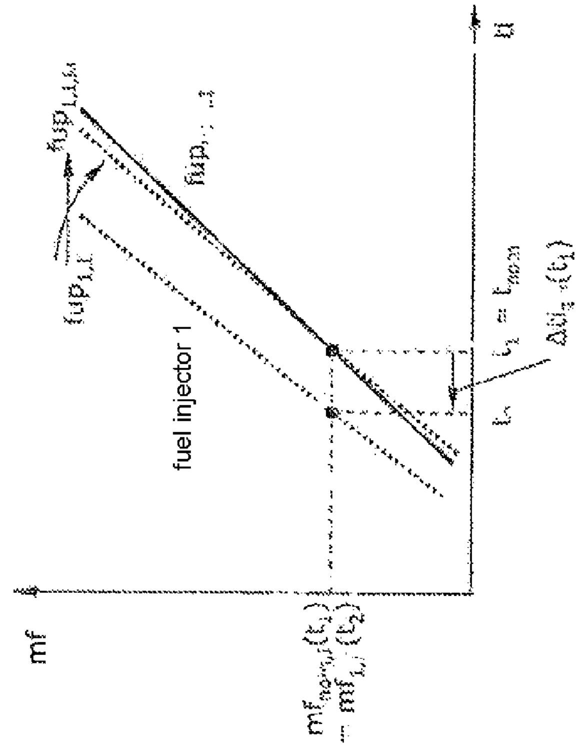
FIG. 6 shows a shift according to various embodiments of a typical injection characteristic curve of a fuel injector to the nominal injection characteristic curve.

It is therefore possible to modify or adapt the individual injection characteristic curve $fup_{1,I}$ and also the typical injection characteristic curve $fup_I$ to the nominal injection characteristic curve $fup_{nom,I}$, which is shown in FIG. 6. Here, the individual injection characteristic curve $fup_{1,I}$ or the typical injection characteristic curve $fup_I$ are brought into congruence at $mf_{nom,I}$ ($t_1$) at $t_1$ with the nominal injection characteristic curve $fup_{nom,I}$, that is to say the two characteristic curves $fup_{1,I}$/$fup_I$, $fup_{nom,I}$ intersect here. Furthermore, it is possible to additionally adapt the individual injection characteristic curve $fup_{1,I}$ or the typical injection characteristic curve $fup_1$ to the nominal injection characteristic curve $fup_{nom,I}$, as long as a mutual characteristic is known. FIG. 6 additionally shows, for example, the possibility of turning the individual injection characteristic curve $fup_{1,I}$ or the typical injection characteristic curve $fup_I$ with respect to the nominal injection characteristic curve $fup_{nom,I}$; see also below. Moreover, other adaptation functions (polynomial, exponential functions, etc.) can also be used.

Figure 7:
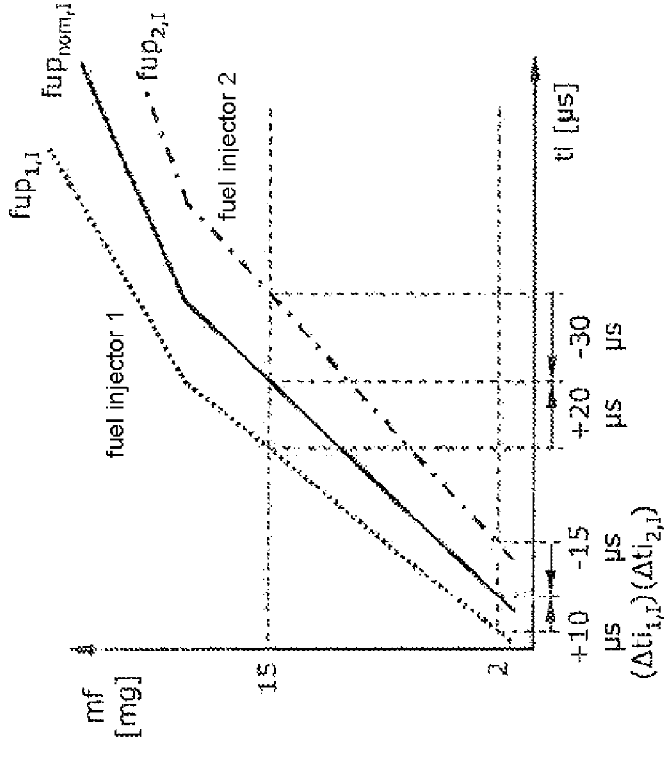
FIG. 7 shows an adaptation according to various embodiments of typical injection characteristic curves of two fuel injectors to the nominal injection characteristic curve.

FIG. 7 explains the various embodiments using one example. In the case of an injection quantity of $mf_1=mf_2=2$ mg of fuel, the respective time deviation $\Delta ti_{1,I}$, $\Delta ti_{2,I}$ for the fuel injector 1 is $\Delta ti_{1,I}=10$ μs and for the fuel injector 2 is $\Delta ti_{2,I}=-15$ μs. As a result of the spread, these time deviations are 20 μs and −30 μs in the case of an injection quantity of $mf_1=mf_2=15$ mg of fuel. That is to say, according to various embodiments the time deviations in the case of $mf_1=mf_2=2$ mg are multiplied by the factor 2, in order to calculate the time deviations in the case of $mf_1=mf_2=15$ mg and to correct them. Intermediate values are interpolated correspondingly.

Figure 8:
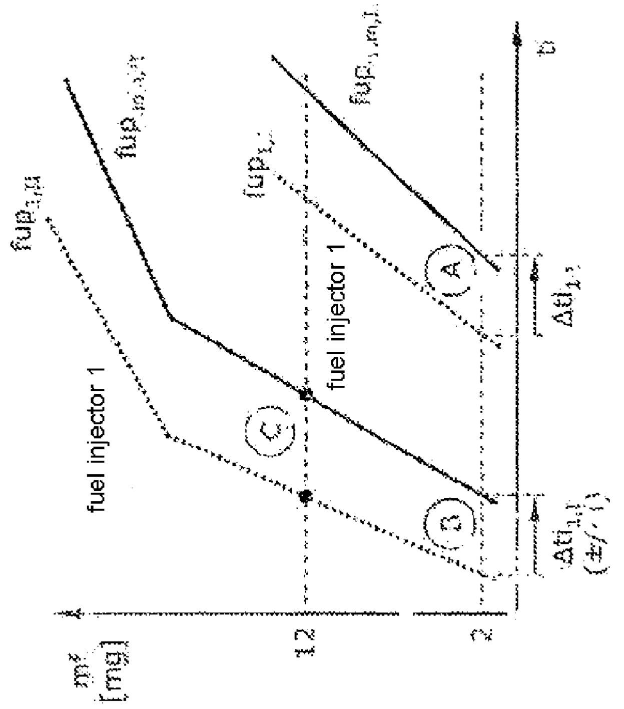
FIG. 8 shows a transfer according to various embodiments of a deviation of an injection quantity, which deviation is determined with regard to a first nominal injection characteristic curve, to a second typical injection characteristic curve with respect to a second nominal injection characteristic curve.

FIG. 8 shows, in steps A, B, C, a transfer of an adapted value from an injection characteristic curve $fup_I$ ($fup_{1,I}$, $fup_{nom,I}$) to a second injection characteristic curve $fup_{II}$ ($fup_{1,II}$, $fup_{nom,II}$). The value which is adapted in the injection characteristic curve $fup_I$ in the case of the injection quantity mf=2 mg is transferred by means of a function to the injection characteristic curve $fup_{II}$. Since the profile of the injection characteristic curve $fup_{II}$ is likewise known, it is then possible according to various embodiments to determine all other injection quantities in $fup_{II}$ in the case of the injection characteristic curve $fup_{II}$ and the injection quantity mf=2 mg, which is shown by way of example in FIG. 8 for the injection quantity mf=12 mg.

What is claimed is:

1. A method for individually correcting at least one of injection quantities and injection times for a fuel injector in an engine of the vehicle, the method comprising:

- measuring an actual injection quantity of the fuel injector at a particular time,
- accessing a typical injection characteristic curve for the fuel injector, the typical injection characteristic curve relating to a plurality of fuel injectors,
- generating an injector-specific characteristic injection curve based at least on the measured actual injection quantity at the particular time,
- during a driving operation of the vehicle, determining an injection quantity deviation between the measured actual injection quantity at the particular time and a nominal injection quantity corresponding to the particular time as defined by a nominal injection characteristic curve for the fuel injector,
- determining an injection time deviation based on the determined injection quantity deviation,
- adjusting the injector-specific characteristic injection curve based on the determined injection time deviation, including:
  - laterally shifting the injector-specific characteristic injection curve by an amount corresponding to the determined injection time deviation, and
  - rotating the injector-specific characteristic injection curve based on stored gradient data for a nominal injection characteristic curve corresponding to the laterally shifted injector-specific characteristic injection curve,
- generating a correction function based on the adjusted injector-specific characteristic injection curve, the correction function defining corrected injection times for providing setpoint injection quantities, and
- subsequently actuating the fuel injector based on the correction function.

2. The method according to claim 1, wherein the injector-specific characteristic injection curve is adapted to the nominal injection characteristic curve based on a parallel, a spread, a polynomial or exponential adjustment.

3. The method according to claim 1, injector-specific characteristic injection curve is at least one of shifted and turned into the nominal injection characteristic curve based on at the injection quantity deviation or the injection time deviation.

4. The method according to claim 1, injector-specific characteristic injection curve is shifted in parallel based on at the injection quantity deviation or the injection time deviation.

5. The method according to claim 1, wherein a part section of the injector-specific characteristic injection curve is adapted to the nominal injection characteristic curve based on at the injection quantity deviation or the injection time deviation.

6. The method according to claim 1, wherein a second injector-specific characteristic injection curve is adapted to a second nominal injection characteristic curve by way of a deviation with regard to a first nominal injection characteristic curve.

7. The method according to claim 6, wherein a correction function or a correction value being taken into consideration in the adaptation of the second injector-specific characteristic injection curve to the second nominal injection characteristic curve.

8. The method according to claim 1, wherein the injection quantity deviation is determined only at a single operating point of the fuel injector.

9. The method according to claim 1, wherein at least one of the injection quantity deviation and the injection time deviation is determined in an overrun mode of a relevant internal combustion engine.

10. The method according to claim 1, wherein at least one of the injection quantity deviation and the injection time deviation is determined by a change in rotational speed on the basis of an injection.

11. The method according to claim 1, wherein the method is carried out in at least one of the ballistic operating range, over substantially the entire ballistic operating range of the fuel injector, and in a needle stop operating range of the fuel injector.

12. The method according to claim 1, wherein the method is carried out in a normal mode of the fuel injector in the internal combustion engine.

13. A controller for individually correcting at least one of injection quantities and injection times for a fuel injector in an engine of a vehicle, wherein the controller is configured:

- to measure an actual injection quantity of the fuel injector at a particular time,
- to access a typical injection characteristic curve for the fuel injector, the typical injection characteristic curve relating to a plurality of fuel injectors, to generate an injector-specific characteristic injection curve based at least on the measured actual injection quantity at the particular time, to determine, during a driving operation of the vehicle, an injection quantity deviation between the measured actual injection quantity at the particular time and a nominal injection quantity corresponding to the particular time as defined by a nominal injection characteristic curve for the fuel injector, to determine an injection time deviation based on the determined injection quantity deviation, to adjust the injector-specific characteristic injection curve based on the determined injection time deviation, including:

laterally shifting the injector-specific characteristic injection curve by an amount corresponding to the determined injection time deviation, and rotating the injector-specific characteristic injection curve based on stored gradient data for a nominal injection characteristic curve corresponding to the laterally shifted injector-specific characteristic injection curve, to generate a correction function based on the adjusted injector-specific characteristic injection curve, the correction function defining corrected injection times for providing setpoint injection quantities, and to subsequently actuate the fuel injector based on the correction function.

* * * * *